US008692690B2

(12) United States Patent  (10) Patent No.: US 8,692,690 B2
Dalal  (45) Date of Patent: Apr. 8, 2014

(54) AUTOMATED VEHICLE SPEED MEASUREMENT AND ENFORCEMENT METHOD AND SYSTEM

(75) Inventor: Edul N. Dalal, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 353 days.

(21) Appl. No.: 13/044,268

(22) Filed: Mar. 9, 2011

(65) Prior Publication Data

US 2012/0229304 A1  Sep. 13, 2012

(51) Int. Cl.
*G08G 1/01* (2006.01)
*H04N 7/18* (2006.01)

(52) U.S. Cl.
USPC ........... 340/936; 340/933; 340/937; 348/149; 702/96; 702/143

(58) Field of Classification Search
USPC ......... 340/936, 933, 937, 931, 916, 905, 907; 348/149, 148; 702/96, 142, 143, 149
See application file for complete search history.

(56) References Cited

U.S. PATENT DOCUMENTS

| 5,381,155 | A |   | 1/1995  | Gerber |         |
|-----------|---|---|---------|--------|---------|
| 5,444,442 | A | * | 8/1995  | Sadakata et al. | 340/916 |
| 5,734,337 | A |   | 3/1998  | Kupersmit |     |
| 6,121,898 | A | * | 9/2000  | Moetteli | 340/933 |
| 6,502,053 | B1|   | 12/2002 | Hardin et al. |   |
| 6,696,978 | B2| * | 2/2004  | Trajkovic et al. | 340/936 |
| 6,771,208 | B2|   | 8/2004  | Lutter et al. |   |
| 7,081,833 | B2| * | 7/2006  | Jo | 340/936 |
| 7,642,928 | B2| * | 1/2010  | Hutchison | 340/907 |
| 7,986,339 | B2| * | 7/2011  | Higgins | 348/149 |
| 2002/0186148 | A1 | | 12/2002 | Trajkovic et al. |  |
| 2004/0030498 | A1 | | 2/2004 | Knoop et al. |     |
| 2008/0015743 | A1 | | 1/2008 | Haug |              |

FOREIGN PATENT DOCUMENTS

GB  2 219 881 A  12/1989
WO  WO 2010/043252 A1  4/2010

OTHER PUBLICATIONS

GB Search Report for GB1203970.7 dated Jun. 21, 2012.
Kato, T. et al., "An Obstacle Detection Method by Fusion of Radar and Motion Stereo," *SICE Annual Conference in Fukui* (Aug. 4-6, 2003), pp. 1656-1661.
Radar Gun with Integrated Video "BINAR", SIMICON, http://www.simicon.com/eng/product/gun/binar.html, Dec. 8, 2010.

* cited by examiner

*Primary Examiner* — Anh V La
(74) *Attorney, Agent, or Firm* — Kermit D. Lopez; Luis M. Ortiz; Ortiz & Lopez, PLLC

(57) ABSTRACT

An automated vehicle speed measurement and enforcement method and system. Traffic can be continuously monitored utilizing an image capturing unit and a controller. The speed of one or more vehicles within an effective field of view of the image capturing unit can be estimated. A burst of radiation from an associated remote sensing device can be triggered when a vehicle is detected having a speed greater than a predetermined value. An accurate speed of the vehicle can then be determined. Additionally, a transverse velocity component associated with the vehicle can be computed by the image capturing unit in order to thereafter apply the transverse velocity component to a reading generated by the remote sensing device to correct a cosine error with respect to the remote sensing device.

20 Claims, 5 Drawing Sheets

AUTOMATED VEHICLE SPEED MEASUREMENT AND ENFORCEMENT METHOD AND SYSTEM

TECHNICAL FIELD

Embodiments are generally related to vehicle speed monitoring systems and methods. Embodiments are also related to RADAR (Radio Detection and Ranging) and LIDAR (Light Detection and Ranging) technologies. Embodiments are additionally related to image capturing devices. Embodiments are further related to the measurement of vehicle speed and law enforcement efforts thereof.

BACKGROUND OF THE INVENTION

Vehicle speed measurement and enforcement systems can be employed to monitor traffic and identify vehicles moving faster than the posted speed limit. Such vehicle speed measurement systems can employ remote sensing devices such as those based on, for example, Radar (Radio Detection and Ranging) or LIDAR (Light Detection and Ranging) to determine the accurate speed of a vehicle by directing a narrow beam of radiation at a vehicle target and analyzing reflected radiation. RADAR or "radar" devices generally utilize radio waves and operate based on the Doppler principle, wherein the frequency of the reflected radiation is shifted according to the relative velocity of the target. LIDAR or "lidar" devices, on the other hand, utilize a laser beam, typically at infra-red frequency, and compute the relative velocity from a time-of-flight calculation performed on the reflected radiation.

The majority of prior art vehicle speed measurement systems utilize a hand-held and/or a vehicle-mounted device to detect the speed of the moving vehicle. Such devices must be aimed directly at the target vehicle and measure only the component of the vehicle velocity directly in a straight line between the device and the vehicle. Consequently, such devices suffer from "cosine error" in real-life situations such as on curved roads, hilly terrain, location of the device on the side of the road or an overhead gantry, etc. Additionally, such hand-held and vehicle-mounted devices must be manually operated by a certified officer and possess an inability to operate in an automated and unattended mode which render them unsuitable for managed transportation services.

Based on the foregoing, it is believed that a need exists for an improved automated vehicle speed measurement and enforcement system and method in order to perform the unattended operation and to correct a cosine error, as described in greater detail herein.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved vehicle speed monitoring system and method.

It is another aspect of the disclosed embodiments to provide for an improved automated vehicle speed measurement and enforcement method and system integrated with an image capturing unit and a remote sensing device.

The aforementioned aspects and other objectives and advantages can now be achieved as described herein. An automated vehicle speed measurement and enforcement system and method is disclosed herein. An image capturing unit (e.g., digital still camera, video camera) can communicate with a remote sensing device (e.g., RADAR, LIDAR) and a controller for continuously monitoring traffic and analyzing speed of a vehicle within an effective field of view. The image capturing unit can trigger a very short burst of radiation from a gun associated with the remote sensing device in order to determine accurate speed of the vehicle when a violator is detected with a speed greater than a predetermined value. A transverse velocity component of the vehicle can be calculated by the image capturing unit and applied to the remote sensing device reading in order to correct a cosine error with respect to the remote sensing device. A violation ticket can be automatically issued by integrating the controller with an appropriate database and the violation can be documented for legal purposes.

The offending vehicle (or offending vehicles) can also be identified by a recognition unit (e.g., a license plate recognition unit) utilizing an image captured by the image capturing unit. Multiple violators at a time can also be targeted for sequential measurement and can be sorted based on at least one criterion in order to ensure a most egregious violator do not have time to respond to a detector signal. Optionally, vehicle targeting can be cancelled upon existence of a potential interference between at least two vehicles. The remote sensing device can be mounted at a fixed and/or portable vantage location in order to perform unattended operation.

The remote image capturing unit can trigger the gun associated with the remote sensing device when the target vehicle is in the precise location with respect to the remote sensing device in order to significantly reduce the firing of the radar gun. The remote sensing device can also be mounted on a one-axis and/or two-axis gimbal unit in order to drive the remote sensing device to a desired location determined by the image capturing unit, thus offering greater flexibility. Such an integrated system is more accurate, resistant to detection, suitable for unattended operation, virtually eliminates the cosine error, and provides a greater resistance to remote sensing detectors.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
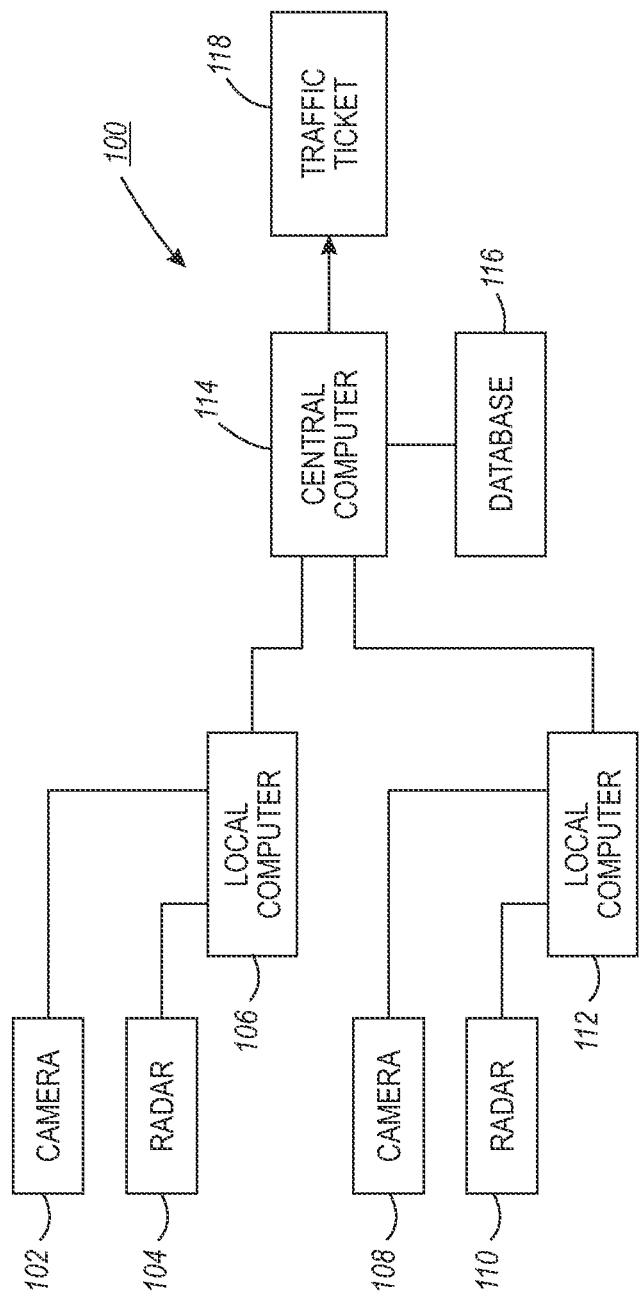
FIG. 1 illustrates an automatic vehicle speed measurement and enforcement system, which can be implemented in accordance with the disclosed embodiments.

The particular values and configurations discussed in these non-limiting examples can be varied and are cited merely to illustrate at least one embodiment and are not intended to limit the scope thereof.

The embodiments now will be described more fully hereinafter with reference to the accompanying drawings in which illustrative embodiments of the invention are shown. The embodiments disclosed herein can be embodied in many different forms and should not be construed as limited to the embodiments set forth herein: rather, these embodiments are provided so that this disclosure will be thorough and complete and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will be appreciated by one skilled in the art, the present invention can be embodied as a method, data processing system, or computer program product. Accordingly, the present invention may take the form of an entire hardware embodiment, an entire software embodiment, or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, etc.

The computer program code for carrying out operations of the present invention may be written in an object oriented programming language (e.g., Java, C++, etc.). The computer program code, however, for carrying out operations of the present invention may also be written in conventional procedural programming languages such as the "C" programming language or in a visually oriented programming environment such as, for example, VisualBasic.

The program code may execute entirely on a local computer, partly on a local computer, as a stand-alone software package, partly on a local computer and partly on a remote computer, or entirely on the remote computer. In the latter scenario, the remote computer may be connected to a local computer through a local area network (LAN) or a wide area network (WAN), wireless data network, e.g., WiFi, Wimax, 802.xx, and cellular network or the connection may be made to an external computer via most third party supported networks (for example, through the Internet using an Internet Service Provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer (e.g., computers 106, 112, 114, etc., indicated herein) or another programmable data processing apparatus to function in a particular manner such that the instructions stored in the computer-readable memory produce an article of manufacture including instruction means which implement the function/act specified in the block or blocks.

The computer program instructions may also be loaded onto a computer (e.g., computers 106, 112, 114, etc., indicated herein) or other programmable data processing apparatus to cause a series of operational steps to be performed on the computer or other programmable apparatus to produce a computer implemented process such that the instructions which execute on the computer or other programmable apparatus to provide steps for implementing the functions/acts specified in the block or blocks.

Figure 2:
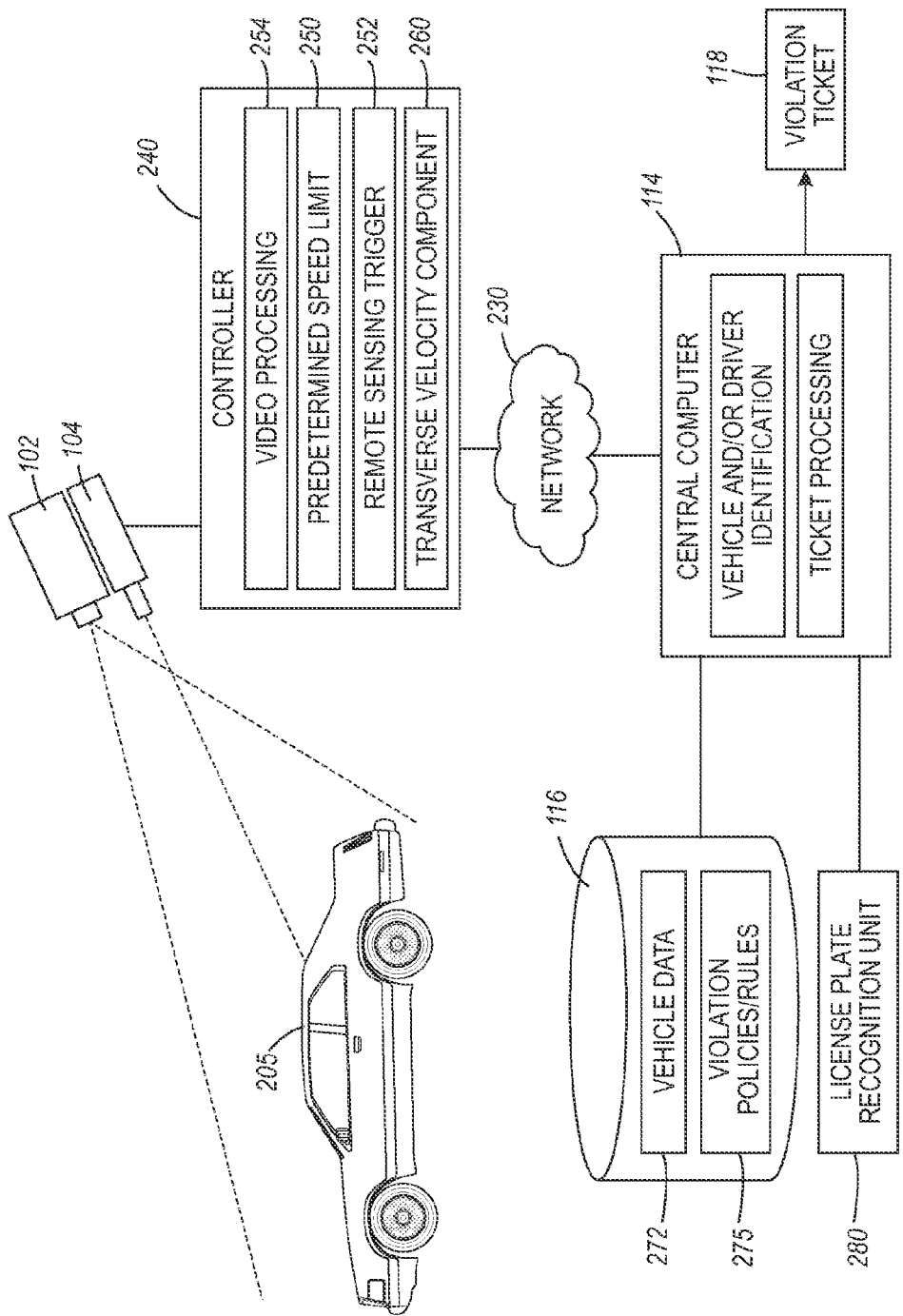
FIG. 2 illustrates an alternative automatic vehicle speed measurement and enforcement system, which can be implemented in accordance with the disclosed embodiments.

FIGS. 1-2 are provided as exemplary diagrams of data-processing environments in which embodiments of the present invention may be implemented. It should be appreciated that FIGS. 1-2 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

FIG. 1 illustrates an automated vehicle speed measurement and enforcement system 100, which can be implemented in accordance with the disclosed embodiments. System 100 includes, for example, an image capturing unit 102 (e.g., a digital still camera, a video earners, etc.) and a remote sensing device 104 (e.g., a radar gun) that communicate with a local computer 106. System 100 can also include, for example, a second image capturing unit 108 and a second remote sensing device 110 that communicate with a second local computer 112. Note that images captured by the image capturing unit 102 can be a single image, a group of images, or video. Thus, in some embodiments, the image capturing unit 102 may be a video camera while in other embodiments, the image capturing unit 102 may be a digital still camera that captures single digital images or groups of images.

The local computers 106 and 112, as well as additional local computers, in turn can communicate with a central computer 114, which in turn communicates with a database 116, which can be a physical database or a digital database or a combination thereof. In general, database 116 can be a system that organizes, stores, and retrieves large amounts of data easily. Database 116 is generally configured as an organized collection of data for one or more uses, typically in digital form. Database 116 can also be managed utilizing a DMS (Database management System), which is not shown in FIG. 1, and which is capable of storing database contents, allowing data creation and maintenance, and search and other access features. Note that the central computer 114 of system 100 can issue a ticket 118 as will be discussed in greater detail herein.

System 100 thus includes at least two distinct computer systems: the central computer 114 and one or more local computers 106, 112. The local computers 106 and/or 112 can be configured in some embodiments as unattended computers, without most peripherals such as keyboard, mouse, monitor, etc. Each of the local computers 106, 112 include, however, at least a processor (not shown). The local computers 106, 112 function to receive and process a video camera feed, estimate vehicle velocities, identify potential violators, trigger a RADAR or LIDAR gun as necessary, and compute a transverse velocity of a target, if desired. The local computers 106, 112 can then transmit resulting data (e.g., vehicle speed, time, location, and selected images) to the central computer 114. The local computers 106, 112 may perform automatic license plate recognition or this function may be performed at the central computer 114.

The central computer 114, which also includes at least a processor (not shown) processes input from one or more of the local computers 106, 112. The central computer 114 may perform automatic license plate recognition based on the images sent from the local computers 106 and/or 112 to the central computer 114. In some embodiments, the central computer 114 can extract driver images. Additionally, in some embodiments the central computer 114 can look up license plate data in the database 116 and identify corresponding driver/owner information, and also process and issue the ticket 118.

Although not required, the disclosed embodiments can be described in the general context of computer-executable instructions such as program modules being executed by a single computer. In most instances, a "module" constitutes a software application. Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implement a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application such as a computer program designed to assist in the performance of a specific task such as word processing, accounting, inventory management, etc.

FIG. 2 illustrates a block diagram of an automated vehicle speed measurement and enforcement system 200, in accordance with the disclosed embodiments. Note that in the figures herein, identical or similar blocks are generally indicated by identical reference numerals. System 200 represents an embodiment similar to system 100 depicted in FIG. 1 with variations. For example, the vehicle speed measurement and enforcement system 200 generally includes the same database 116 as shown in FIG. 1, along with an image-capturing unit 102 (e.g., a video camera) integrated with a remote sensing device 104 (e.g., a radar gun). It can be appreciated that the system 200 shown in FIG. 2 can include, for example, the image capturing unit 108 and the remote sensing device 110 and the local computer 112, but such components are not discussed with respect to FIG. 2 for the sake of simplicity.

In the configuration depicted in FIG. 2, the remote sensing device 104 can be a RADAR or LIDAR gun. The remote capturing unit 102 (which can be integrated with the remote sensing device 104) can communicate with the local computer 106, which in turn can communicate with a network 230.

Figure 3:
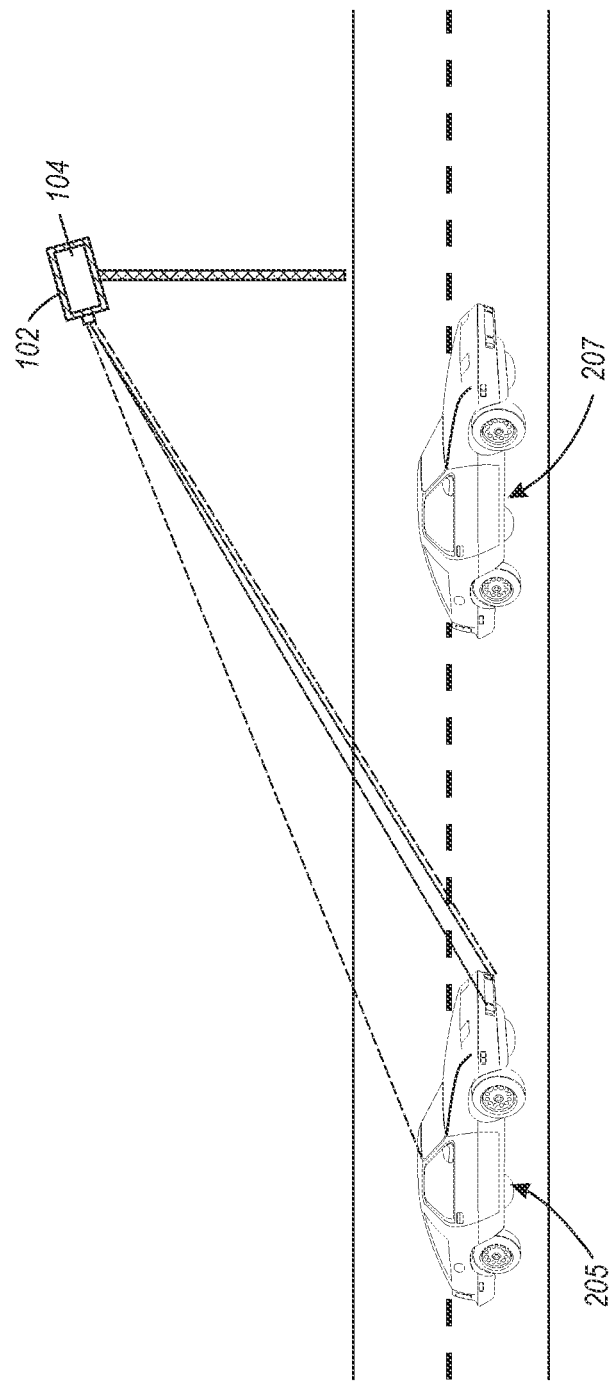
FIG. 3 illustrates a schematic diagram of an image capturing unit integrated with a remote sensing device for monitoring traffic violations of vehicles, in accordance with the disclosed embodiments.

The central computer 114 can include a controller 240 that assists in continuously monitoring traffic and analyzing speed of a vehicle 205 within an effective field of view (see FIG. 3 for more details). The image-capturing unit 102 in association with the remote sensing device 104 can be operatively connected to the controller 240.

Note that the network 230 may employ any network topology, transmission medium, or network protocol. The network 230 may include connections such as wire, wireless communication links, or fiber optic cables. Network 230 can also be an Internet representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational, and other computer systems that route data and messages.

The image capturing unit 102 in association with the remote sensing device 104 can be operated as a stationary device and/or a vehicle-mounted device. Note that the image capturing unit 102 is generally similar to the image capturing unit 108 of the system 100, depicted in FIG. 1. The image capturing unit(s) discussed herein may include built-in integrated functions such as image processing, data formatting, and data compression functions. Also, such image capturing units can include appropriate image or remote capturing components as required for particular applications.

The controller 240 shown in FIG. 2 can include or may be associated with one or more modules such as, for example, a video or image processing module 254, a predetermined speed module 250, a remote sensing trigger module 252, and a transverse velocity component module 260. The controller 240 processes the video from image capturing unit 102 and estimates the speed of vehicles, which enter its field of view. The remote sensing device 104 can be triggered to emit radiation when the estimated speed of the vehicle 205 exceeds a predetermined value, as determined by the predetermined speed module 250.

The remote sensing device 104 can be, for example, a RADAR device or a LIDAR device, depending upon design considerations. A radar device determines the speed of the vehicle 205 utilizing the principle of Doppler effect. Radio waves can be directed towards the moving vehicle 205 and the frequency of the reflected radiation can be determined relative to the frequency of the transmitted radiation. The obtained frequency variation is related to the sped of the surface moving towards the radar transmitter or away from the radar transmitter. Such a phenomenon can be employed for detecting speed violations based on the measured speed sped and the predetermined speed limit value. Similarly, a LIDAR is an optical remote sensing device that emits a laser beam, typically at infra-red frequency, and computes relative speed from a time-of-flight calculation on the reflected radiation. Thus, the image capturing unit 102 and the remote sensing device 104 can be integrated into a singe device, depending upon design considerations.

The remote sensing device 104 emits a short burst of radiation when a violator is detected with a speed greater than a predetermined value in order to determine the accurate speed of the vehicle 205. In some embodiments, the remote sensing device 104 may be triggered only when a suitable violator is identified in order to significantly reduce the number of firings of the RADAR or LIDAR gun. Additionally, a transverse velocity component of the vehicle 205 can be calculated by the image capturing unit 102 and applied to the remote sensing device 104 reading in order to correct, for example, a cosine error with respect to the remote sensing device 104.

The central computer 114 receives digital information (e.g., captured digital images and detected speeds) from the image capturing unit 102 and the remote sensing device 104 and processes such information via a processor (not shown in FIG. 2). The images captured by the image capturing unit 102 typically include one or more images of the vehicle 205 committing the violation (e.g., exceeding the speed limit), as well as images of the vehicle license plate and optionally images of the driver's face, to provide vehicle and driver identification information. Images of the license plate of the vehicle 205 can be transmitted to a license plate recognition unit 280.

The license plate recognition unit 280 depicted herein represents one type of recognition module that can be employed for identifying one or more offending vehicles from an image (e.g., a single image, multiple images, video images, etc.) captured by the image capturing unit 102. It can be appreciated that other recognition modules or techniques can also be utilized in accordance with other embodiments. That is, for example, a recognition unit for identifying particular types of vehicles, not just license plates, may be implemented in place of or in association with the licensing plate recognition unit 280. In general, such a recognition module can be implemented as a hardware module and/or a software module that offers at least a license plate recognition capability derived from the captured image or images of the offending vehicle(s).

The operations and instructions related to vehicle recognition and ticket issuing are preferably accomplished via the central computer 114 rather than the local controller 240. It is possible, however, that the vehicle recognition and ticket issuing operations and instructions can be accomplished outside of the local system. The image capturing unit is typically a camera (e.g., video camera, digital still camera, etc.), and calculations are typically accomplished via the controller 240.

Based on the vehicle license plate information, the identity of the violator can be determined utilizing vehicle data 272 stored in the database 116. Data 275 indicative of violation policies/rules and so forth can also be stored in and retrieved from database 116. Data 275 can be retrieved and analyzed in order to determine an appropriate violation ticket 118. Such a violation ticket 118 can be automatically issued via the interaction of the controller 240 with the database 116 with respect to the vehicle data 272 and data 275 stored in the database 116. The appropriate violation with respect to the violation ticket 118 can also be documented for legal purposes.

The various instances of the local computer(s) 106, and its associated image capturing unit(s) 102 and remote sensing device(s) 104, may be positioned at strategic locations where traffic speed enforcement is desired such as highways, city streets, school zones, etc. They may be located in fixed positions such as on an overhead gantry or highway sign structure, or they may be mounted on vehicles, which can be driven or parked at strategic locations. The central computer 114 and/or the database 116 may be located at an appropriate motor vehicle department or other agency. Several of the local computers 106, and their associated image capturing units 102 and remote sensing devices 104, may be networked to a single central computer. Alternatively, for some applications, the functions of the local computers and the functions of the central computer may be located in a single computer. In general, as indicated in FIG. 2, the central computer 114 can implement instructions for vehicle and/or driver identification and ticket processing.

FIG. 3 illustrates a schematic diagram of the image capturing unit 102 integrated with the remote sensing device 104 for monitoring traffic violations with respect to the vehicle 205, in accordance with the disclosed embodiments. As depicted in FIG. 3, multiple violators (e.g., vehicles 205, 207, etc.) can be targeted at a given time for sequential measurement. The multiple violators can be sorted based on one or more criteria (e.g., estimated speed) in order to ensure that the most egregious violators do not have time to respond to a detector signal. Optionally, targeting can be cancelled if a potential interference, which prevents a clean measurement, exists between at least two vehicles. The image capturing unit 102 integrated with the remote sensing device 104 can be mounted in a fixed direction at a stationary or portable vantage location so that the image capturing unit 102 can trigger the gun associated with the remote sensing device 104 when the target vehicle 205 is in the precise location with respect to the remote sensing device 104. The image capturing unit 102 integrated with the remote sensing device 104 can also be mounted on a one-axis or two-axis gimbal unit in order to drive the remote sensing device to a desired location determined by the image capturing unit 102, thus offering greater flexibility.

Figure 4:
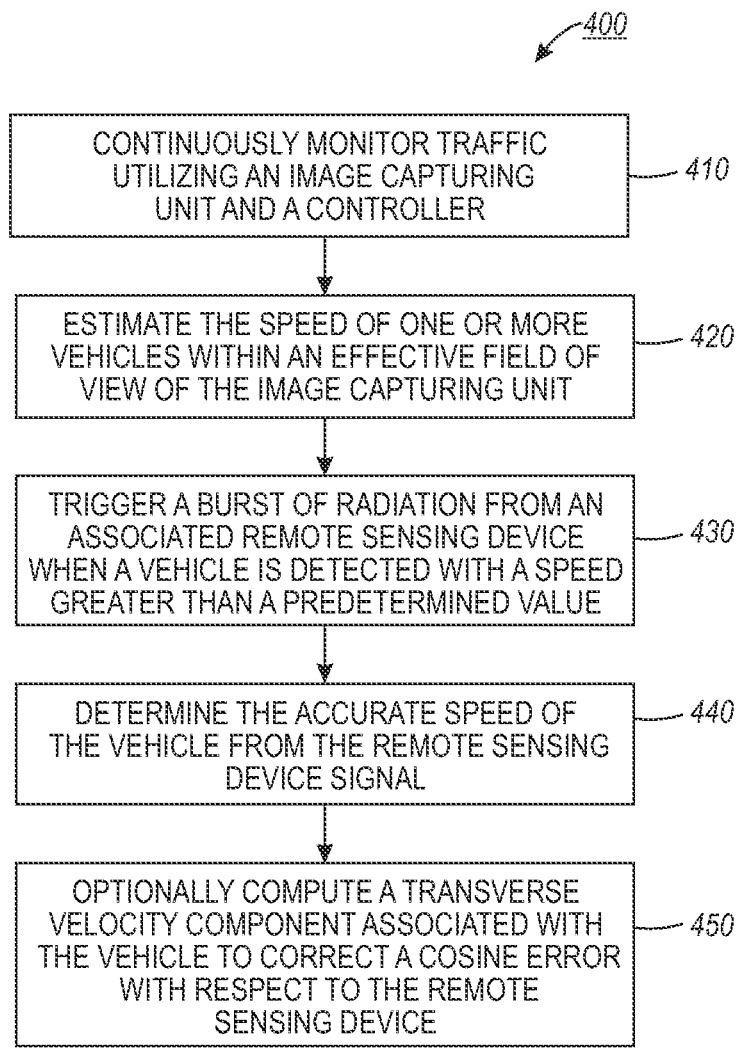
FIG. 4 illustrates a high level flow chart of operation illustrating logical operational steps of a method for continuously monitoring traffic and analyzing the speed of vehicles, in accordance with the disclosed embodiments.

FIG. 4 illustrates a high level flow chart of operation illustrating logical operational steps of a method 400 for continuously monitoring traffic and analyzing speed of a vehicle (e.g., vehicles 205, 207, etc.) within an effective field of view utilizing the image capturing unit 102, the remote sensing device 104, and the controller 240, in accordance with the disclosed embodiments. Note that although the discussion below with respect to FIG. 4 refers to the remote sensing device 104 and the image capturing unit 102, the method 400 of FIG. 4 can apply equally to the remote sensing device 110 and the image capturing unit 108 shown in FIG. 1, along with the location computers 106 and/or 112. The same holds true for the method 500 of FIG. 5 discussed further below.

As discussed previously, the age capturing unit 102 can be integrated with the remote sensing device 104 and can also communicate with the controller 240. Note that in some embodiments, the image capturing unit 102, the remote sensing device 104, and the controller 240 may actually be integrated with one another. As indicated next at block 410, traffic can be continuously monitored utilizing the image capturing unit 102 and the controller 240. Next, as depicted at block 420, an operation can be implemented for estimating the speed of one or more vehicles within an effective field of view of the image capturing unit 102. Thereafter, as illustrated at block 430, a burst of radiation can be triggered from the associated remote sensing device 104, for example, when a vehicle is detected with a speed greater than a predetermined value (e.g., see module 250 of FIG. 2). Next, as indicated at block 440, the accurate speed of the vehicle can be determined. Note that an additional step can be implemented, as depicted at block 450, to compute the transverse velocity component associated with the vehicle (e.g., vehicle 205) to correct a cosine error with respect to the remote sensing device 104.

Figure 5:
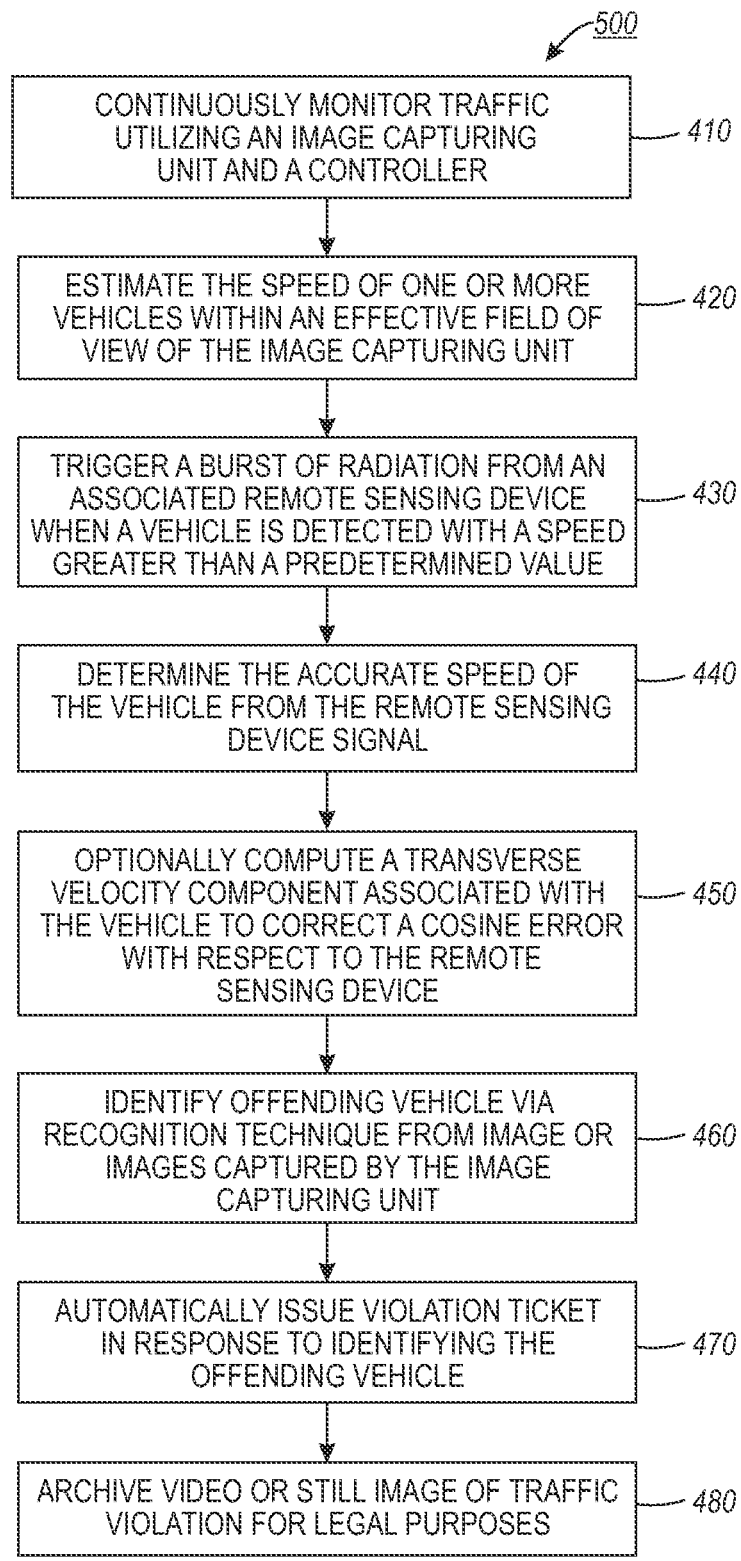
FIG. 5 illustrates a high level flow chart of operation illustrating logical operational steps of an alternative method for continuously monitoring traffic and analyzing the speed of vehicles, in accordance with the disclosed embodiments.

FIG. 5 illustrates a high level flow chart of operation illustrating logical operational steps of an alternative method 500 for continuously monitoring traffic and analyzing the speed of vehicles, in accordance with the disclosed embodiments. Note that the method 500 shown in FIG. 5 is similar to the method 400 depicted in FIG. 4. Thus, the operations depicted at blocks 410, 420, 430, 440, and 450 in FIG. 4 are also included as a part of the method 500 illustrated in FIG. 5. A description of such operations will not be repeated here. In general, following the processing of the operation indicated at block 450, the offending vehicle (or offending vehicles) can be defined via a recognition technique from an image or a group of images captured by an image capturing unit, as indicated at block 460. Then, as described at block 470, a violation ticket can be automatically issued in response to identifying the offending vehicle. Thereafter, as indicated at block 480, the traffic violation can be archived for legal purposes. It can be appreciated that such an archiving operation can also be implemented in some embodiments without identifying the actual vehicle and/or issuing the traffic violation ticket.

Based on the foregoing, it can be appreciated that the methods and systems disclosed herein are more accurate than prior approaches. Additionally, the disclosed methods and systems are resistant to detection, suitable for unattended operation, and virtually eliminate the cosine error while providing a greater resistance to RADAR and/or LIDAR detectors.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for measuring vehicle speed, said method comprising:
continuously monitoring traffic utilizing an image capturing unit and a controller that communicates with said image capturing unit;
estimating via said controller, the speed of at least one vehicle within an effective field of view of said image capturing unit;
triggering a burst of radiation from an associated remote sensing device when said at least one vehicle is detected with a speed greater than a predetermined value, said image capturing unit in association with said remote sensing device operably connected to said controller;
determining an accurate speed of said at least one vehicle; and
computing a transverse velocity component associated with said at least one vehicle by said image capturing unit in order to thereafter apply said transverse velocity component to a reading generated by said remote sensing device reading to correct a cosine error with resect to said remote sensing devices.

2. The method of claim 1 further comprising identifying at least one offending vehicle via a recognition unit from at least one image captured by said image capturing unit.

3. The method of claim 2 further comprising configuring said recognition unit recognize license plates and particular types of vehicles.

4. The method of claim 2 further comprising automatically issuing a violation ticket in response to identifying said at least one offending vehicle, said violation ticket associated with a particular traffic violation.

5. The method of claim 4 further comprising archiving at least one image of said particular traffic violation for legal purposes.

6. The method of claim 1 further comprising sequentially measuring speed of a plurality of violators at a time, said plurality of violators having been sorted based on at least one criterion in order to ensure the most egregious violators do not possess time to respond to a detector signal.

7. The method of claim 1 further comprising cancelling targeting of at least two selected vehicles among said traffic upon existence of a potential interference between said at least two vehicles.

8. The method of claim 5 further comprising mounting said remote sensing device in a fixed direction in order to perform an unattended operation.

9. The method of claim 5 further comprising mounting said remote sensing device on a one-axis gimbal unit, said gimbal unit being controlled by said controller.

10. The method of claim 5 further comprising mounting said remote sensing device on a two-axis gimbal unit, said gimbal unit being controlled by said controller.

11. A system for measuring vehicle speed, said system comprising:
an image capturing unit and a controller that continuously monitor traffic, such that a speed of at least one vehicle is estimated within an effective field of view of said image capturing unit, wherein said controller communicates with said image capturing unit;
a remote sensing device that is triggered by said controller to emit a burst of radiation when said at least one vehicle is detected with a speed greater than a predetermined value in order to determine an accurate speed of said at least one vehicle wherein said image capturing unit in association with said remote sensing device is operably connected to said controller; and
wherein a transverse velocity component associated with said at least one vehicle is computed by said system in order to apply said transverse velocity component to a reading generated by said remote sensing device reading to correct a cosine error with respect to said remote sensing device.

12. The system of claim 11 further comprising a recognition module for identifying at least one offending vehicle from at least one image captured by said image capturing unit.

13. The system of claim 12 wherein said recognition module further comprises a license plate recognition and type of vehicle recognition capability derived from said image.

14. The system of claim 13 wherein a violation ticket is automatically issued in response to identifying said at least one offending vehicle, said violation ticket associated with a particular traffic violation.

15. The system of claim 14 further comprising an archive for archiving said particular traffic violation.

16. The system of claim 15 wherein a speed of a plurality of violators is sequentially measured, said plurality of violators having been sorted based on at least one criterion in order to ensure the most egregious violators do not possess time to respond to a detector signal.

17. The system of claim 16 wherein a targeting of at least two selected vehicles is cancelled upon a potential interference between said at least two vehicles.

18. The system of claim 15 wherein said remote sensing device is mounted in a fixed direction to perform an unattended operation.

19. The system of claim 15 wherein said remote sensing device is mounted on a one-axis gimbal unit, said gimbal unit subject to control by said controller.

20. The system of claim 15 wherein said remote sensing device is mounted on a two-axis gimbal unit, said gimbal unit subject to control by said controller.

* * * * *